June 18, 1946.  E. J. SULLIVAN  2,402,462
GOB FORMING MECHANISM
Filed April 14, 1943  3 Sheets-Sheet 1

Inventor
E. J. SULLIVAN
By Rule and Hoge,
Attorneys

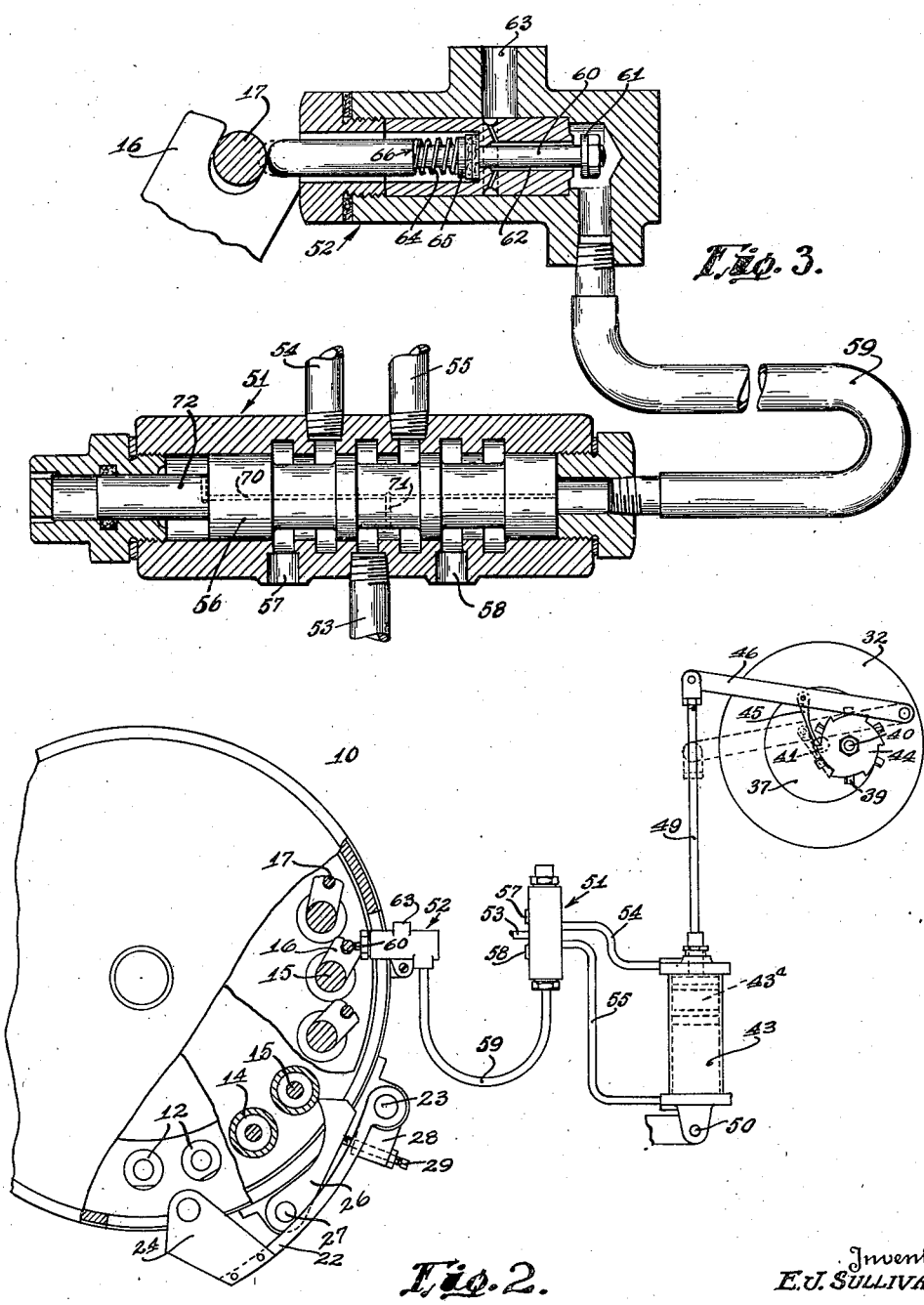

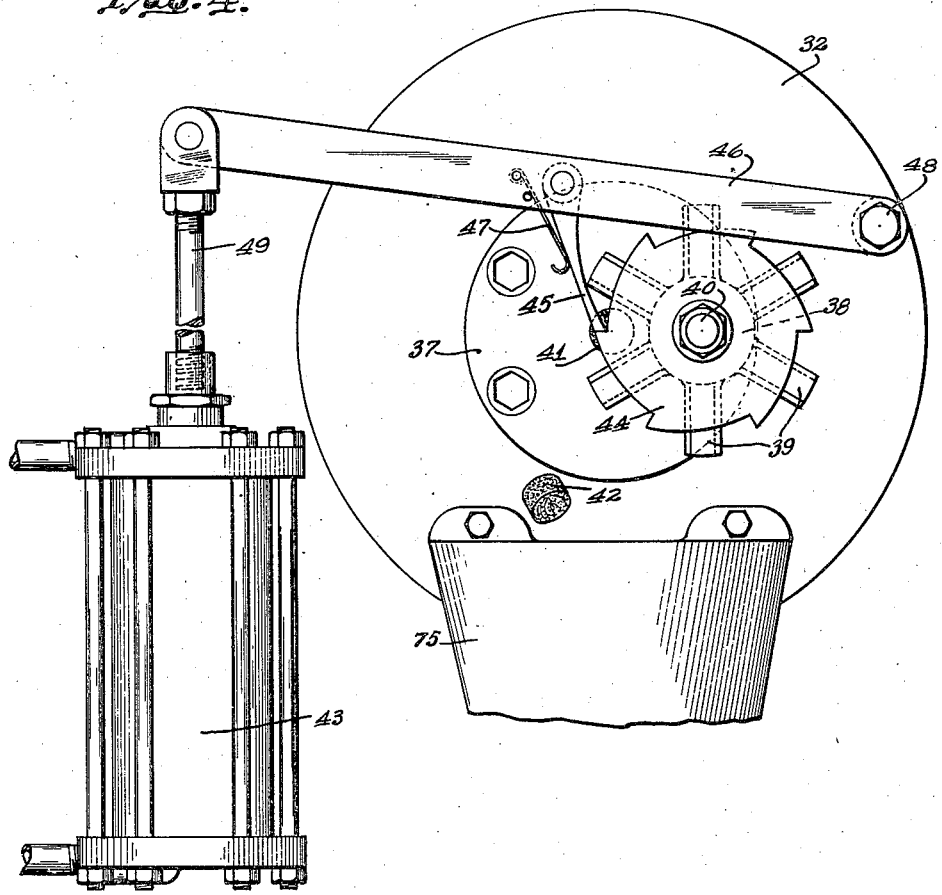
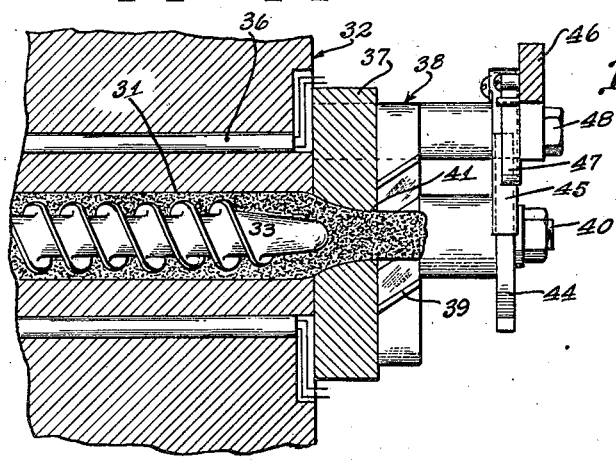

Patented June 18, 1946

2,402,462

UNITED STATES PATENT OFFICE 2,402,462

GOB FORMING MECHANISM

Emmet Joseph Sullivan, Toledo, Ohio, assignor to Owens-Illinois Glass Company, a corporation of Ohio Application April 14, 1943, Serial No. 482,984

2 Claims. (Cl. 18—12)

My invention relates to apparatus for use in heat treating molding materials and forming individual mold charges or gobs. It includes means for heating and plasticizing a molding material, extruding the plastic material through a die, severing it into individual gobs or mold charges, and delivering such charges to a molding machine.

An object of the invention is to provide an apparatus adapted for treating molding powders of the thermoplastic type, for producing mold charges and delivering them to a molding machine.

A further object of the invention is to provide an apparatus for supplying and adapting mold charges of organic, thermoplastic material to a machine such, for example, as the Lauterbach machine which is designed and ordinarily used for molding organic plastics of the thermosetting type. In such a machine, mold charges of the thermosetting material are usually supplied to the molds which are maintained at a high temperature, so that the molding compound after being softened and molded, is hardened and set under the combined heat and pressure to which it is subjected within the molds. The present invention provides a means for supplying charges of thermoplastic molding material to the molds in a hot and plastic condition, so that the material may be molded and set within the molds while the latter remain cool, and without the need of cooling hot molds after each molding operation.

Other objects of the invention will appear hereinafter:

Referring to the accompanying drawings:

Fig. 1 is an elevation of an apparatus embodying my invention as used with a molding machine of the Lauterbach type, the illustration of the molding machine being diagrammatic.

Fig. 2 gives a part-sectional plan view of the molding machine, the gob forming mechanism being shown diagrammatically.

Fig. 3 is a sectional view of the valve mechanism controlling the piston motor.

Fig. 4 is a front elevation of the gob forming and severing mechanism.

Fig. 5 is a sectional elevation of the same.

Figure 1:
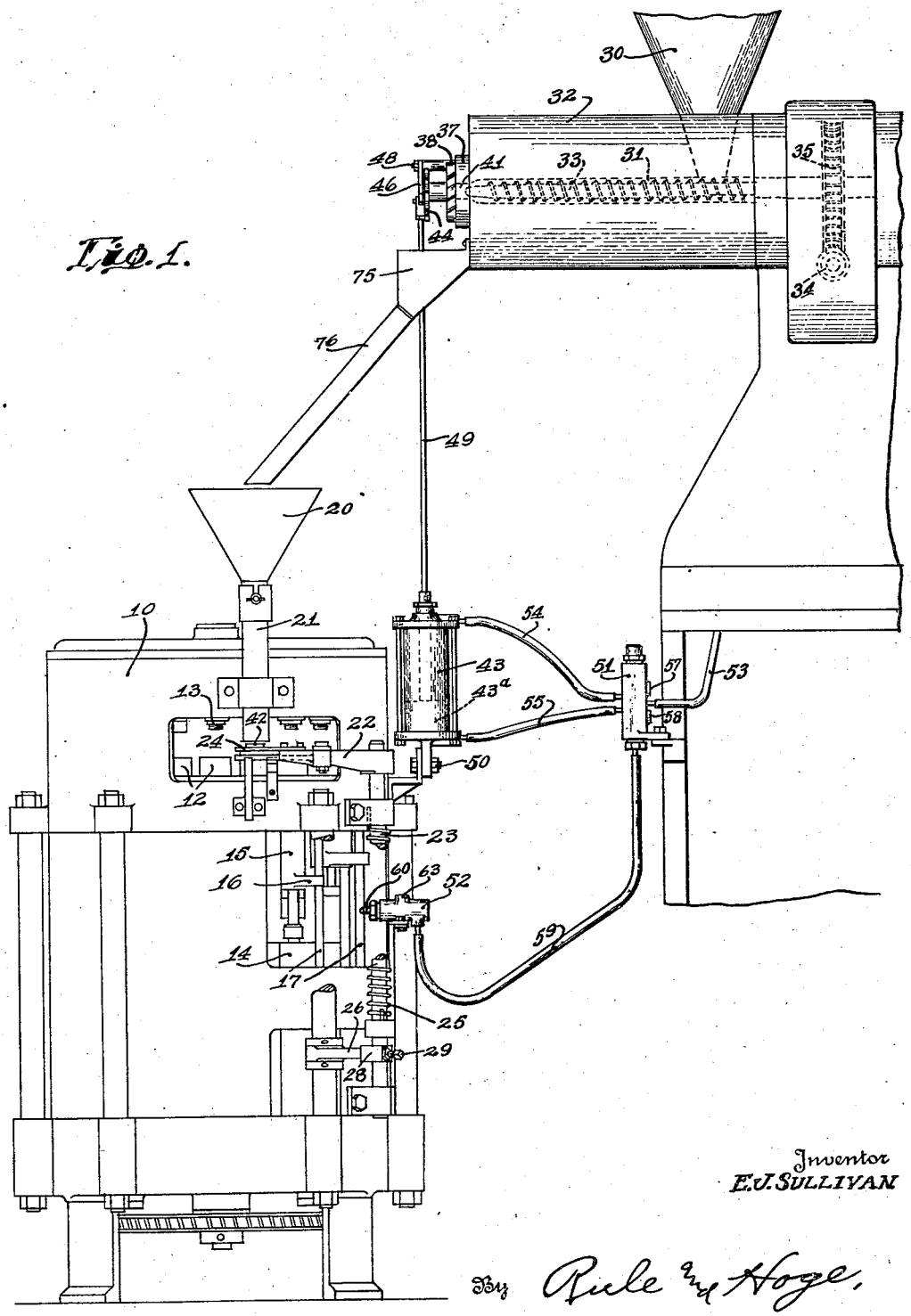

Referring to Figs. 1 and 2, the invention is illustrated as adapted for use with a Lauterbach machine 10 and its mold charging mechanism, such as fully shown and described in United States Patent No. 2,235,222, Lauterbach, March 18, 1941, Mold charging mechanism. Such a machine comprises a carriage rotatable about a vertical axis and carrying an annular series of molding units. Each unit includes a mold section or die 12 adapted to receive a charge of molding material and then to be lifted to cooperate with a die member 13. The dies 12 are lifted and lowered by means of piston motors individual thereto, each comprising a cylinder 14, piston and piston rod 15. The piston rods are held against rotative movement by means of arms 16 attached thereto and having their outer ends forked to straddle guide rods 17 fixed to the carriage.

The mold charging mechanism includes a hopper 20, and a vertical spout 21 having a stationary mounting on the machine frame. A rock arm 22, attached to a vertical rock shaft 23, carries a transfer cup 24 at its outer end. The arm 22 is periodically rocked to swing the cup from a charge-receiving position beneath the spout 21 to a discharging position over a die 12, the dies being brought in succession to charge-receiving position in synchronism with the movements of the transfer arm 22. The shaft 23 is rocked in one direction for swinging the rock arm 22 inwardly by a coil spring 25.

The means for swinging the rock arm 22 outwardly includes a rock arm 26 (Fig. 2), pivoted at 27 and having its outer end extending into the path of the motor cylinders 14. A rock arm 28 on the shaft 23 carries a stop screw 29 which bears against the arm 26. Each cylinder 14 as it advances, swings the arm 26 outwardly to the position shown in Fig. 2, thereby swinging the arm 22 outwardly against the tension of the spring 25. Reference may be had to the above mentioned Patent 2,235,222, for a full disclosure of the mold charging mechanism above described.

In accordance with the present invention, the thermoplastic material in powdered or granulated form, for forming the mold charges, may be fed through a hopper 30 into a heating chamber 31 within a cylinder 32. Within the chamber 31 and extending lengthwise thereof, is a feed screw 33 which may be rotated continuously by means of a worm 34 which drives a worm gear 35 fixed to the screw propeller 33. Electric heaters 36 (Fig. 5) are mounted in the cylinder 32 and maintain it at the required temperature for heating the molding material and bring it to a molten or plastic condition.

The plastic material is forced through an extrusion die plate 37 attached to the front face of the cylinder 32. The material as it is extruded, is severed into individual gobs or mold charges.

The severing mechanism includes a rotary cutter 38 formed with radial knife blades 39. The cutter 38 is fixed to a shaft 40 journalled in the die plate. The blades 39 are arranged to bear against the outer face of the extrusion die plate 37, and as the cutter is rotated step by step in the manner hereinafter described, the blades shear across the outlet opening 41 in the plate 37, thereby severing individual gobs 42. The blades are inclined as shown in Fig. 5 and move downwardly across the opening 41.

The cutter is rotated step by step by means of an air-operated piston motor 43, the piston 43a of which operates through a pawl and ratchet mechanism including a ratchet wheel 44 fixed to the shaft 40, and a pawl 45 pivoted to a rock arm 46. The pawl is held against the ratchet wheel by a spring 47. The rock arm 46 is pivoted at one end on a pivot bolt 48 attached to the front face of the cylinder 32, and at its other end is connected to the piston rod 49 of the motor 43. The motor cylinder has a pivotal connection 50 with the molding machine frame.

The operation of the motor 43 is under the control of the motor valve 51 which operates under the control of a control valve 52. Air under pressure for operating the motor 43 is supplied through a pressure supply pipe 53 leading to the motor valve 51, and pipes 54 and 55 leading from the valve 51 to the upper and lower ends respectively of the motor.

Referring to Fig. 3, the motor valve 51 includes a piston 56 which when in the position shown, connects the pressure supply pipe 53 with the pipe 55, while the pipe 54 is open to an exhaust port 57, so that air pressure is supplied to the lower end of the motor 43 and operates to move the motor piston upward. When the valve piston 56 (Fig. 3) is moved to the left, the air connections are reversed so that air pressure is supplied through the pipe 54 for lowering the motor piston, the pipe 55 being open to an exhaust port 58. A pipe 59 connects the valve chambers of the valves 51 and 52.

The control valve 52 includes a valve rod 60 mounted for lengthwise movement and having a valve head 61 adapted when moved to the left (Fig. 3), to close a port opening 62 which communicates with an exhaust port 63. The valve is normally held closed by a coil compression spring 64 mounted on the valve rod and held under compression between a collar 65 loose on said rod, and a shoulder 66 on the rod. The valve rod 60 projects into the path of the rods 17 so that as the mold carriage rotates, each rod 17 in turn engages the valve rod 60 and cams it to open position as shown in Fig. 3.

The piston 56 of the motor valve 51 is provided with a restricted opening 70 extending throughout its length and communicating through a branch opening 71 with the pressure pipe 53. Air pressure thus is supplied through the channel 70 to both ends of the valve chamber, and the pressure maintained at both ends of the valve piston so long as the control valve 52 remains closed. The effective pressure area at the left end of the valve piston 56 is reduced by the extension 72 having a bearing in the valve casing. The valve piston is thus under a differential pressure which moves it to the left when the control valve 52 is closed. When the latter opens, as shown in Fig. 3, the air pressure at the right end of the valve piston 56 is dissipated so that the valve piston is moved to the right.

The operation may be summarized as follows:

The comminuted molding material is fed into the heating chamber 31 where it is melted or softened and extruded continuously in a plastic condition through the die plate 37. The cutter 38 rotates step by step, shearing off individual gobs 42 which drop into the hopper 75 and down the chute 76 to the hopper 20 of the molding machine. As the mold carriage rotates, the rods 17 (Figs. 2 and 3) operate in succession, each momentarily opening the control valve 52. When the valve 52 opens, the motor valve 51 operates the motor 43, first to lift its piston rod, and immediately thereafter, as the valve 52 is closed, and the motor valve reversed, the motor piston is lowered and operates the pawl and ratchet to rotate the cutter one step and sever a gob. In this manner, the gobs or mold charges are fed to the molding machine in synchronism with the movements of the molds into charge-receiving position.

Modifications may be resorted to within the spirit and scope of my invention.

I claim:

1. The combination of a heating cylinder having a cylindrical opening therein providing a heating chamber, means for heating said cylinder, means for feeding a comminuted molding compound into said chamber, a screw propeller within said chamber, a die plate having a die opening at one end of said chamber through which the material is extruded by said propeller in a plastic condition, means for periodically severing the extruded material in the form of individual mold charges or gobs, said severing means inclding a rotary cutter having radially disposed blades, a piston motor, operating connections between the motor piston and said cutter including a ratchet wheel connected to rotate with the cutter, a pawl for operating the ratchet wheel, and a rock arm providing a connection between the pawl and the motor piston.

2. The combination of a container for a molding material, said container having a discharge opening, a die plate having a die opening in register with said discharge opening, means within said container for extruding the molding material in a plastic condition through the die opening, means for periodically severing the extruded material in the form of individual mold charges, said severing means including a rotary cutter having radially disposed blades, a piston motor, means providing operating connections between the motor piston and said cutter including a rachet wheel connected for rotation with the cutter, a pawl for operating the ratchet wheel, and a rock arm providing a connection between the pawl and the motor piston.

EMMET JOSEPH SULLIVAN.